United States Patent Office 3,093,487
Patented June 11, 1963

3,093,487
EGG PRODUCTS AND PROCESSES FOR
PREPARING SAME
Eynon Jones, Portland, and Oliver H. Tracy, Oswego, Oreg., and Clarence B. Deffenbaugh, Omaha, Nebr., assignors of one-fourth to said Eynon Jones, one-fourth to said Oliver H. Tracy, one-fourth to Roberts Dairy Company, a corporation of Nebraska, one-eighth to Lewis R. Dunham, and one-eighth to Edward Johnson, both of Modesto, Calif.
No Drawing. Filed Feb. 27, 1961, Ser. No. 91,602
5 Claims. (Cl. 99—161)

This invention relates to improved egg products for substantially all purposes where eggs are used and to the processes for preparing such products.

There has long been a need for eggs in a form having better keeping qualities than fresh eggs and also there has been a need for eggs in a form more convenient than shell eggs for commercial handling as well as household use. As a result, the commercial requirements for the manufacture of bakery goods, mayonnaise, and the like, are now largely supplied by powdered eggs, frozen eggs and refrigerated bulk eggs. While eggs in these forms provide the greatest convenience in handling, they do not provide the keeping qualities desired by the trade. There is a very serious problem of spoilage and contamination by harmful bacteria. Bacterial growth not only causes spoilage of the egg product before it is used but also causes contamination and spoilage of the end product in cooked foods where the cooking temperature may not be high enough to effect sterilization or pasteurization, as in the case of custards and custard fillings for pies, and in uncooked products such as mayonnaise and eggnogs. Conventional drying, freezing and bulk liquid refrigeration processes only retard or delay bacterial growth to some extent without effectively killing the bacteria or rendering them incapable of rapid reproduction in a food product providing a favorable environment.

Previous attempts to sterilize or pasteurize eggs have met with difficulty because when the eggs were heated to a temperature high enough to kill toxic and harmful bacteria, the eggs would partially coagulate or cook, rendering them unfit for most purposes. On the other hand, chemical sterilizing additives such as hydrogen peroxide, and additives such as sugars and starches, which raise the coagulation temperature, also render the eggs unfit for many purposes.

There are also other large fields for the use of eggs where conventional powdered eggs, frozen eggs and other egg preparations heretofore proposed have failed to supply an acceptable product. The conventional products have never found acceptance, for example, for either home or restaurant use in the preparation of scrambled eggs and omelets. For such purposes, shell eggs have always been demanded.

The general object of the present invention is to provide new and improved formulas and processes which will produce egg products that are more stable and have a wider field of use than conventional products and to produce products that are salmonella bacteria-free and as safe to consumers as pasteurized Grade A milk under the standards of the U.S. Public Health Grade A Milk Code.

Other objects are to provide an improved process permitting higher pasteurizing temperatures, to provide a product having denatured and stabilized milk proteins, to increase water retention and improve the baking ability of egg products for bakery goods, to provide a market for cracked eggs, eggs with defective shells and pullet eggs that are too small to provide a satisfactory return to the producer, to provide new and improved forms of egg products to better utilize and preserve seasonal surplus eggs and to improve the handling and marketing of such eggs, to provide new formulas and processes which will greatly improve the quality of powdered egg product and frozen egg product and greatly extend their shelf life, to provide an egg product which will make acceptable scrambled eggs and omelets and to provide a product having a composition formulated especially for the mayonnaise industry.

The invention relates principally to formulations of egg, milk solids and vegetable oil, although a product is also made without milk solids for use in the manufacture of mayonnaise. The ingredients are homogenized, pasteurized and stabilized in liquid form to provide products for many purposes where shell eggs are ordinarily used in the home and in industry. The stabilized liquid products can also be spray dried into powder form for many purposes where shell eggs are ordinarily used in the home and in industry. The powder may be pressed into tablets if desired. The liquid product may also be frozen in the customary manner. For purposes where powdered, frozen or refrigerated bulk liquid eggs are now used, the present processes provide superior egg products which are more stable and more safe for consumers. The formulas are very flexible owing to the complex compositions of both eggs and milk. For example, a formula with high protein, low fat content can be made for overweight people.

The success of the process and the great improvement of the product over conventional products available on the market are attributed in large part to a novel interrelation and cooperation between the homogenizing and pasteurizing steps permitting the use of higher pasteurizing temperatures with a closer approach to complete sterilization of the product than has been attainable heretofore in an uncooked product. It is recognized that the albumen in egg whites normally coagulates on a hot surface at a temperature far too low for effective pasteurization. In the past this problem has been attacked by the use of additives such as sugars and starches to raise the coagulation temperature of the albumen. Such additives, however, so change the nature and flavor of the egg product that the use of the product is quite limited. It can be used for sweet or starchy bakery goods and the like but it is not suitable for other uses where the starch and sugar content are undesirable as, for example, in scrambled eggs, omelets and mayonnaise.

It is also recognized that egg whites will withstand a much higher temperature before coagulation begins if the egg material is separated from the hot surface by a layer or film of oil. This phenomenon is employed to advantage in the present process not solely by the addition of oil but, more importantly, by homogenizing the egg and oil mixture prior to a final high temperature pasteurizing step. The theory is advanced that in the homogenizing step each particle of the extremely fine dispersion of egg solids is coated and enveloped in a film of oil. When this dispersion is pasteurized it is found that far higher temperatures can be employed in a conventional plate heater with metallic surfaces than could heretofore be used.

In previous attempts to pasteurize eggs a relatively low limiting temperature has always been found to exist not merely because of impairment of the qualities of the product by coagulation but even more critically because of the tendency of the chalazae in particular to stick to the plates when it coagulates. The chalazae are relatively tough and fibrous strands of protein material which anchor the yolk in a central position in the egg. These strands are quite resistant to disintegration by ordinary mixing or pumping and are prone to cook on a hot surface.

In order to keep the plates of the pasteurizer clean and the passageways open for fluid circulation, it has been necessary to limit the temperature to a value considerably below that which would produce a salmonella-free product. Moreover, the condition is aggravated as soon as the chalazae begin to adhere to the pasteurizer plates because the adherent material forms an insulating barrier impeding the normal rate of heat transfer through the plates from the heating medium to the high velocity liquid product. With such impaired heat transfer the plate temperature rises and the adherent material is literally cooked on the plates. At the same time, the temperature of the liquid product is reduced because of the insulating barrier between it and the plates and the pasteurization becomes even less effective. When this occurs the plant must be shut down and the pasteurizer taken apart and thoroughly cleaned.

In certain prior processes the homogenization step has followed the pasteurizing step, the only recognized purpose of homogenization being to stabilize the product so that the solids would not tend to settle out or stratify in the liquid. This has introduced additional difficulties flowing from the condition just described. Even before the chalazae exhibit a tendency to stick to the pasteurizing plates they may be partially coagulated while still flowing freely with the liquid material. The same is true of the other albumen and other proteins in both the yolks and whites but the chalazae cause the most difficulty in the process. Denaturized and partially coagulated chalazae readily plug the minute orifices in the homogenizer, bringing the whole operation to an abrupt halt and creating dangerously high pressures in the homogenizer. Again, when this occurs, the only remedy is to take the homogenizer apart and clean it thoroughly. The same difficulty is encountered in the nozzle orifices of a spray dryer.

In the present process the homogenizing step precedes the final high temperature pasteurizing step. This sequence has definite advantages. First, it overcomes the two adverse conditions above described. By homogenizing before the final pasteurizing step, there is no possibility of coagulated chalazae strands getting into the homogenizer to clog its orifices. The homogenizer is capable of disintegrating the chalazae into a fine dispersion in the liquid when the chalazae are in their original uncoagulated condition. Also, the disintegrated and dispersed chalazae flow with the liquid stream and do not stick to the pasteurizer plates.

Further, with this sequence of steps, it is found that the albumen and other egg proteins, particularly the chalazae, will withstand a far higher temperature in a subsequent pasteurizing step. The protection of the albumen and other proteins by the oil appears to be far more effective when the egg material is reduced to an extremely fine dispersion than when the solids are merely beaten or mixed with oil in the absence of homogenization. When the egg-oil mixture is homogenized together there is some degree of denaturation of the proteins when higher pasteurizing plate temperatures are employed but in practice it is found that the plate temperature may be raised considerably higher without any tendency of the material to coagulate and stick to the plates. Further, it is believed that the degree of denaturation which does occur in the homogenized fine dispersion produces a beneficial rather than a deleterious effect on the product.

In order to take maximum advantage of the phenomenon of oil envelopment of the egg solids as hereinabove described, it is preferred to pre-heat the mixture before the homogenizing step. Egg yolks themselves contain a substantial percentage of natural fat which is available to act in the same manner as the added oil if the material is warmed to a degree sufficient to make the natural fats free flowing in the mixture. For this reason it is desirable to interpose the homogenizing step between a pre-heating step and the final pasteurizing step.

While the natural fats in the yolks themselves are effective, after homogenization, in allowing higher pasteurizing temperatures, it is still not possible to operate metallic surfaces at a sufficiently high temperature to produce a salmonella-free product. In the present processes the added oil augments the effect of the natural yolk fats to permit a sufficiently high plate temperature to produce a salmonella-free product without protein coagulation and without the material sticking to the plates. Conventional plate heaters may thus be used in all heating steps whereby the whole process may be carried out most economically and expeditiously as a continuous flow process wherein each heating step is accomplished rapidly in a manner often referred to as flash heating.

The ingredients are first mixed and standardized in a tank and then pumped in continuous flow, or substantially continuous flow, through a pre-heater, a homogenizer, a pasteurizer and a holder tube assembly to maintain pasteurizing temperature for the desired interval of time. Then the material is rapidly cooled to a temperature at which no further denaturation will occur. At this point the material may be spray dried directly, if desired.

If the material is not dried immediately it may be held temporarily in cold tank storage. From the cold tank storage, which holds the product in refrigerated liquid condition, it may also be withdrawn for merchandising in a refrigerated liquid state the same as milk or it may be frozen.

This process permits the use of equipment familiar to the dairy industry. The heaters and coolers preferably comprise plate-type heat exchangers using hot and cold water as the heating and cooling media. The pre-heater and first cooler may, however, be economically combined in a regenerative heat exchanger where the hot outgoing fluid is cooled by giving up its heat to the cold incoming fluid without intermixing the two fluids.

A typical batch make-up starting with 1000 pounds of liquid whole egg testing 25.5% total solids is as follows:

*Batch No. 1*

| Ingredient | Pounds | Percent total solids | Pounds T.S. |
| --- | --- | --- | --- |
| Whole egg | 1,000.0 | 25.5 | 255.0 |
| Skim milk | 749.0 | 8.5 | 63.3 |
| Spray nonfat dry milk | 93.5 | 96.5 | 90.2 |
| Oil | 75.0 | 100.0 | 75.0 |
| Salt | 8.0 | 100.0 | 8.0 |
| Totals for batch | 1,925.5 | 25.5 | ¹ 491.5 |

¹ Total solids.

It will be observed that the total solids for the batch bears the same relation to the total weight of liquids plus solids that the total solids in an egg bears to the total weight of the liquids plus solids in the egg. As stated above, this ratio is 25.5%. In the present process there is no gain or loss of liquid. The liquid or frozen product obtained from the above batch may accordingly be used in most any recipe or formula calling for whole eggs, without any adjustment or alteration of specified quantities of eggs.

Weight comparisons for the 1,925.5 pound batch:

|  | Percent |
| --- | --- |
| Whole egg | 51.93 |
| Skim milk | 38.90 |
| Spray nonfat dry milk | 4.85 |
| Oil | 3.90 |
| Salt | .42 |
|  | 100.00 |

For the purpose of making powder only, a typical batch is standardized as follows:

*Batch No. 2*

| Ingredient | Pounds | Percent total solids | Pounds T.S. |
|---|---|---|---|
| Whole egg | 1,000.0 | 25.5 | 255 |
| Condensed skim milk | 463.7 | 33.0 | 153 |
| Oil | 75.0 | 100.0 | 75 |
| Salt | 8.0 | 100.0 | 8 |
| Totals for batch | 1,546.7 | 31.75 | 491 |

The total solids of the above batch is 31.75% of the total weight of liquids and solids.

The percentage of ingredients in relation to standardized total solids are the same for both batches, as follows:

|  | Percent |
|---|---|
| Whole egg | 51.93 |
| Milk solids not fat | 31.20 |
| Oil | 15.27 |
| Salt | 1.60 |
|  | 100.00 |

In this connection it will be observed that the total solids in both batches are practically the same, the total solids in the skim milk and dry milk in the first batch being practically equal to the total solids in the condensed skim milk in the second batch. By standardizing the second batch with 33% condensed skim milk instead of the skim milk and powder used in the first batch, there are 378.8 pounds less water to remove in the dryer. In a similar manner, skim milk with more or less solids content may be used in the first batch by adjusting the weight of the liquid milk to furnish the specified total solids content. When the milk has less than 33% of solids as specified in the second batch, the deficiency may be made up either by using more milk or by adding milk solids as an additional ingredient as was done in Batch No. 1.

In spray powder testing of the egg powder product (either first or second batch described above) 2.5% and 3.5% moisture content, the ingredient relationships are as follows:

|  | Percent | |
|---|---|---|
| Moisture | 2.50 | 3.50 |
| Whole egg | 50.63 | 50.11 |
| Milk solids not fat | 30.42 | 30.11 |
| Oil | 14.89 | 14.74 |
| Salt | 1.56 | 1.54 |
|  | 100.00 | 100.00 |

For economic reasons the oil is preferably a vegetable oil such as corn oil, which gives excellent results. The oil can be butterfat and other animal fat or various vegetable oils or both, either hydrogenated or not. The milk solids not fat can come from skim milk, condensed skim milk or nonfat milk powder; or they could come from whey solids, buttermilk and/or cultured nonfat milk solids, depending upon the nature of the end product in which the present egg product is to be used.

The above percentages are preferred from the standpoint of flavor and the behavior of the product in its many applications as mentioned hereinabove but these specified percentages are not critical. The percentages of ingredients in relation to standardized total solids may vary through rather wide ranges as indicated below:

|  | Percent |
|---|---|
| Whole egg | 40–95 |
| Milk solids not fat | 1–50 |
| Oil | 5–20 |
| Salt | 0–2 |

Other ingredients may also be added for flavor or other purposes, such as anti-oxidants, and all such ingredients do not affect the process nor alter the essential characteristics of the product. For example, there may be added oyster or shrimp extractives, cheese, fine herbs, tomato, celery, onion or garlic. In some cases such ingredients may be added at the beginning of the process, at an intermediate stage or subsequent to the present treatment. Ingredients in finely ground dehydrated form may be added to the powder after drying. These substances will provide a variety of flavors for omelets and other purposes.

The basic process of the invention is especially well suited for making a superior egg product for the mayonnaise industry. A typical batch for this purpose is 50% egg yolk and 50% vegetable oil with no milk or milk solids added. The percentages can be varied to suit the specifications of the mayonnaise manufacturer within the range: liquid egg yolk approximately 30% to approximately 95% and oil approximately 70% to approximately 5%, total weight basis. For salad dressings whole eggs may be used instead of yolks, with appropriate seasonings.

When the present product is to be used by the baking industry, the milk solids, whether obtained in liquid form as condensed skim or in powder form, are preferably high-heat treated. This greatly improves the moisture retention in many products. For example, it makes cakes dry out less quickly and it prevents the familiar "weeping" of scrambled eggs, omelets and custards. In this respect, the present products provide scrambled eggs, omelets and custards superior to those made with fresh eggs while at the same time retaining the egg taste.

A suitable high-heat treatment for the milk solids involves heating the source milk to some temperature in the range between 190° and 230° F., depending on the degree of denaturing desired. The milk may be heated in a heat exchanger under pressure two to four minutes before it is run to the condensing unit. The fluid is concentrated by evaporation in a vacuum pan, coming out at a temperature of around 130° F., which is suitable for introduction into the present process whenever it is desired to couple this milk treatment with the present process. Alternatively, either condensed skim or dried milk solids, high-heat treated as above described, may be obtained from a separate source.

The improved moisture retention in the end product as mentioned above results from the denaturation of the milk proteins in the high-heat treatment. These denaturized milk solids also provide a good buffer augmenting the action of the oil and the natural fats in the egg to prevent coagulation of the egg proteins under abnormally high pasteurizing temperatures. Whereas egg material alone tends to coagulate before denaturizing, the presence of the denaturized milk proteins along with the oil when the eggs are homogenized allows denaturation of the egg material to proceed to a desirable point in the pasteurizing step without coagulation. This accounts in part for the great flexibility of the present formulation. The oil content may be reduced to a very low percentage when the amount of high-heat treated milk solids is increased and, vice versa, with sufficient oil in the formulation, the milk solids content may be reduced to zero as in the case of the product formula for use in mayonnaise. A strictly reciprocal relation is not implied, however, because in the case of the product for use in mayonnaise only the egg yolks are used and there is no problem involving the coagulation of the egg whites, particularly the chalazae, in the pasteuring step.

In view of these considerations, the present process is considered to begin with the formulation of a batch as outlined hereinabove. The ingredients are thoroughly stirred and blended and standardized to the desired percentages. The material is then preheated to a temperature of approximately 135° F., causing the natural fats in the egg yokes to become free flowing and available to assist the added oil and milk solids buffer in a subsequent high temperature pasteurizing step. The time in the preheater is not critical but if a conventional plate-type heat exchanger is employed in a continuous flow process, the pre-heating time does not exceed a few seconds. The temperature in the preheater may vary in the range 125° to 140° F. provided that the time interval is not unduly prolonged at the high end of the range.

From the preheater the material flows directly, without cooling, to a homogenizer adjusted to approximately 2000 pounds' working pressure. This pressure may vary in the range between 1000 to 2500 pounds per square inch. At such pressures and in the absence of any coagulation, the chalazae are effectively reduced to a fine dispersion wherein each particle is coated and enveloped by a film of oil comprising the natural yolk fats as well as the added oil, and the milk solids buffer when the formulation includes milk solids. Under these conditions the chalazae do not tend to clog the homogenizer orifices and the process works smoothly.

With the finely dispersed chalazae and other egg proteins thus protected, the material is pasteurized at a temperature of approximately 161° F. and held at this temperature as, for example, in a holder tube assembly, for approximately one minute. Here, again, in a continuous process a plate-type heat exchanger is preferred, the material flowing through the heat exchanger to the holding tube in a matter of seconds or less. However, the pasteurizing step may also be carried out in a batch-type process in which case the pasteurizing temperature would be approximately 145° F. with a thirty minute hold. In the continuous flow process the pasteurizing temperature range is 150° to 170° F. with a hold time from sixteen seconds to one minute, the shorter time being used with the higher temperature and the longer time with the lower temperature. Under the conditions described, this pasteurizing treatment makes possible a great deal less difficulty from the standpoint of coagulation and from the standpoint of the chalazae sticking to the plates of the heat exchanger. The egg proteins are denaturized to a desirable extent without coagulation. The result is a liquid product which is salmonella bacteria-free and which may be dried to a powder that is likewise salmonella bacteria-free.

If the egg product is to be sold as a liquid or frozen product, it is taken from the holder tube of the pasteurizer, or from the vat in a batch process, and exploded into a vacuum vessel which carries a vacuum of approximately twenty inches of mercury. Volatile substances contributing to undesirable odors and flavors are thereby removed and the product is cooled rapidly by expansion. Following the vacuum treatment the product is cooled down to 40° F. or lower.

If the product is to be manufactured into spray powder, it is rapidly cooled down in a plate heat exchanger from the pasteurizer temperature to approximately 140° F. It may then be immediately sprayed into the drying machine at approximately 2500 pounds' working pressure, or it may be held temporarily in cold hold tank storage for drying later. Again, the protection afforded to the egg proteins by the added oil and milk solids buffer, when milk solids are present in the formula, permits a higher drying temperature, without cooking the egg proteins, than has heretofore been possible. This increases the efficiency of the dryer, particularly when a low moisture content powder is desired. The chalazae being in a state of extremely fine dispersion, there is no tendency for the dryer nozzles to clog.

When the resulting powder is reconstituted at the rate of 27 pounds of powder to 73 pounds of potable water, it makes excellent scrambled eggs, French toast and egg omelet. The salt in the formulation counteracts the sweetness of the milk sugars which might otherwise be objectionable in such cookery. Flavors may be added as hereinabove mentioned. The product is comparable to fresh market eggs when cooked in the form of scrambled eggs, French toast, and egg omelet. In some taste panels that were held, they were indistinguishable from those made from average market eggs. Moreover, the scrambled eggs and omelets do not weep moisture onto the plate if not immediately eaten as is the case with fresh eggs. This feature is of particular advantage in restaurant operation where conventional powdered eggs have never met customer acceptance for such purposes.

The present powder product also serves as well as fresh whole eggs in cream pies, custard and pumpkin pie mix, sweet rolls and doughnuts. It can be used dry in some cake baking formulas and may be reconstituted ahead of mixing time for others.

Either the frozen, liquid or powdered form of the product may be used for all purposes mentioned herein. Being salmonella-free, the product is safe for the consumer and has a long shelf life. This attribute thus removes a major cause of deterioration of eggs and many products containing eggs.

Having now described our invention and in what manner the same may be used, what we claim as new and desire to protect by Letters Patent is:

1. The method of preparing a salmonella-free homogenized and pasteurized egg product without coagulating the same comprising adding to natural shelled eggs a mixture of oil and milk solids in such amount that the end product has the ratio of total solids to total water plus solids that is the same as the ratio of total solids of a natural egg to total solids and water in a natural egg, the oil being selected from the group comprising animal oil and vegetable oil, the total amount of the oil and milk solids being less than the weight of the natural shelled eggs, mixing the natural shelled egg and the added material, pre-heating the mixture to approximately 135° F. to make the natural fats in the natural shelled eggs free flowing, reducing the mixture to a state of fine dispersion, heating said dispersion to a pasteurization temperature of within the range of 150° F. to 170° F. by bringing the same into contact with the plates of a heat exchanger, and holding the dispersion at said temperature to destroy substantially all of the pathogenic bacteria contained in the egg product.

2. The method of preparing a salmonella-free homogenized and pasteurized egg product without coagulating the same comprising adding to a natural shelled egg product a mixture of oil and milk solids, the oil being selected from the group comprising animal oil and vegetable oil, the oil being added in an amount wherein the mixture obtained is in the range of 5% to 20% oil, mixing the natural shelled egg product and the added material, pre-heating the mixture to approximately 135° F. to make the natural fats in the natural shelled eggs free flowing, reducing the mixture to a state of fine dispersion, heating said dispersion to a pasteurizing temperature of within the range of 150° F. to 170° F. by bringing the same into contact with the plates of a heat exchanger, and holding the dispersion at said temperature to destroy substantially all of the pathogenic bacteria contained in the egg product.

3. The method defined in claim 2 wherein the milk solids are prepared by the process including heating the source milk material to a temperature in the range of between 190° F. and 230° F.

4. The method of preparing a salmonella-free homogenized and pasteurized egg product without coagulating the same, comprising adding to natural shelled eggs a mixture of oil and milk solids in such amount that the end product is approximately 51.93% whole egg, 31.20% milk solids not fat, 15.27% oil and 1.6% salt, the oil being selected from the group comprising animal oil and vegetable oil, mixing the natural shelled egg and added material, preheating the mixture to approximately 135° F. to make the natural fats in the natural shelled eggs free flowing, reducing the mixture to a state of fine dispersion, heating said dispersion to a pasteurizing temperature of within the range of 150° F. to 170° F. by bringing the same into contact with the plates of a heat exchanger, and holding the dispersion at said temperature to destroy substantially all of the pathogenic bacteria contained in the egg product.

5. The product resulting from the process of claim 1.

References Cited in the file of this patent

UNITED STATES PATENTS

| | | |
|---|---|---|
| 1,897,775 | Tranin | Feb. 14, 1933 |
| 2,395,587 | Scott et al. | Feb. 26, 1946 |
| 2,479,310 | Chapin | Aug. 16, 1949 |
| 2,920,954 | North et al. | Sept. 5, 1950 |
| 2,982,663 | Berquist | May 2, 1961 |

FOREIGN PATENTS

| | | |
|---|---|---|
| 324,637 | Great Britain | Jan. 27, 1930 |